UNITED STATES PATENT OFFICE.

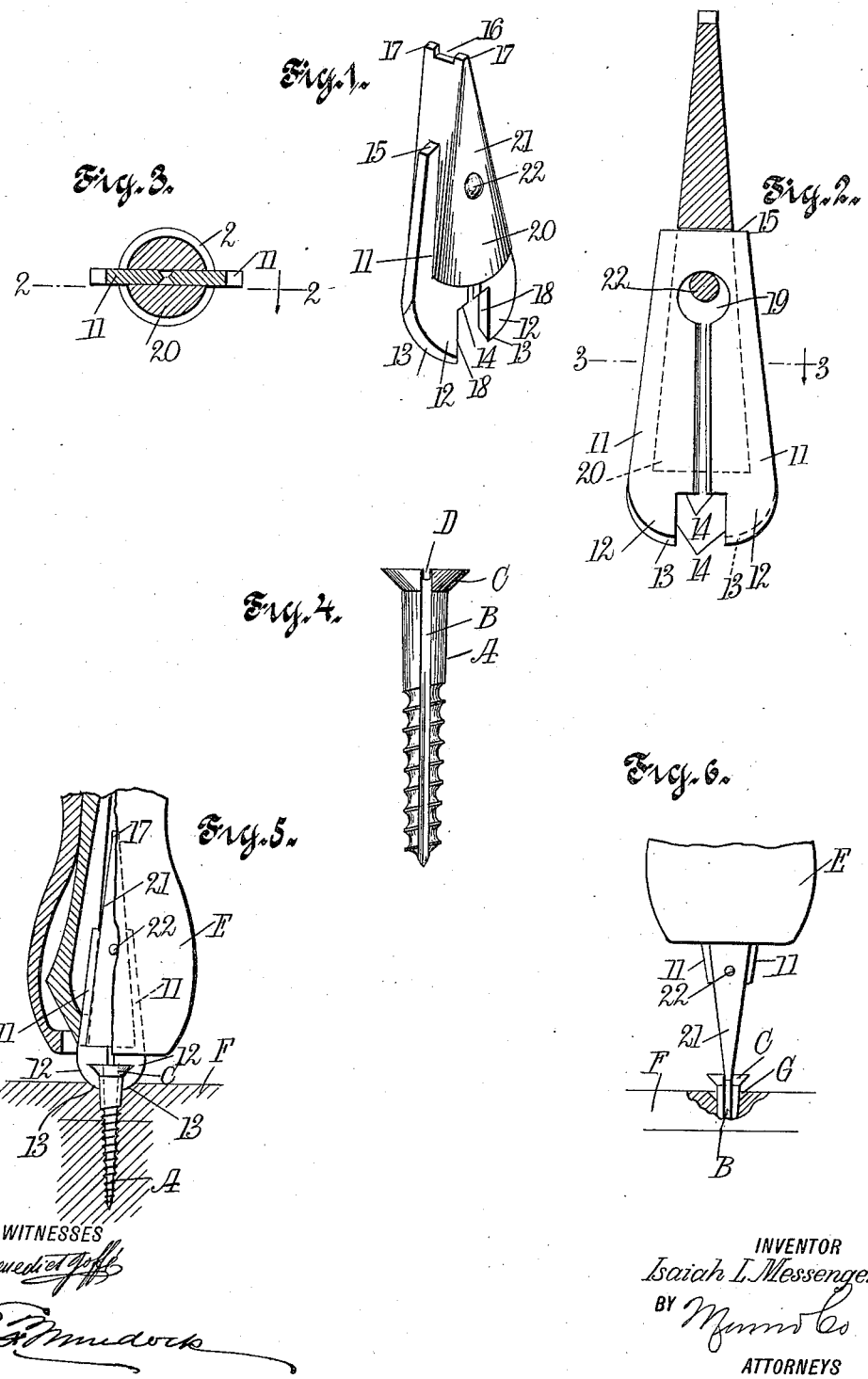

ISAIAH L. MESSENGER, OF DE RUYTER, NEW YORK, ASSIGNOR TO R. DE WITT BURDICK AND LEE C. SAUNDERS, BOTH OF LINCKLAEN CENTER, NEW YORK.

SCREW-DRIVER.

1,027,877.  Specification of Letters Patent.  Patented May 28, 1912.

Application filed August 11, 1911. Serial No. 643,520.

*To all whom it may concern:*

Be it known that I, ISAIAH L. MESSENGER, a citizen of the United States, and a resident of De Ruyter, in the county of Madison and State of New York, have invented a new and Improved Screw-Driver, of which the following is a full, clear, and exact description.

Among the principal objects which the present invention has in view are: to provide a tool of the character named having gripping jaws to hold a screw while the same is being driven; and to provide jaws of the character named having extended ends arranged for reaming a seat for the screw head.

One embodiment of the present invention is disclosed in the structure illustrated in the accompanying drawings, in which like characters of references denote corresponding parts in all the views, and in which—

Figure 1 is a perspective view of a tool constructed and arranged in accordance with the present invention; Fig. 2 is a vertical section taken on the line 2—2 in Fig. 3; Fig. 3 is a cross section taken on the line 3—3 in Fig. 2; Fig. 4 is a side view of a screw to operate which the present invention is designed; Fig. 5 is a side elevation of a screw and driver constructed in accordance with the present invention, shown in conjunction with a fragment of a brace, a portion of the brace being cut away to show the driver held therein; and Fig. 6 is an edge view of a driver constructed and arranged in accordance with the present invention and shown in conjunction with a holding brace, the driver being reversed in the brace from the position shown in Fig. 5.

The screw A shown in the accompanying drawings, to operate which the present driver is designed, is disclosed in an application for Patent No. 567,856, filed by me June 20, 1910, to which application cross reference is here made. One of the distinctive features of the screw as shown is that it is provided on both sides with a longitudinally extended groove B. To fit the grooves B the blades 11, 11 are provided with the extended ends 12, 12. The ends 12, 12 are curved at the lower extremity, as best seen in Fig. 2 of the drawings. The lower edges 13 of the ends 12 are ground to a cutting edge to form a ream or seat for the head C of the screw A. The blades 11, 11 form a squared opening between the ends 12 which freely pass over the body portion or shank of the screw A opposite the grooves B. The squared shoulders 14 of the blades 11 rest in the kerf D of the screw. Opposite the ends 12 of the blades 11 are formed the straight edges 15.

To impart to the blades 11 resiliency to contract the said blades upon the shank of the screw A to grip the bottom of the grooves B by the straight surfaces 18 of the ends 12, the metal of the said blades is cut away to form the opening 19 adjacent the edge 15, as seen best in Fig. 2 of the drawings. The diminished metal between the outer edges of the blades 11 and the opening 19 forms a resilient section for said blades. The blades 11 are movably mounted between the extensions 20 of the body portion of the driver 21. The blades 11 are held between the extensions 20 by the rivet pin 22, which pin, as seen in Fig. 2 of the drawings, bears lightly against the upper extension of the opening 19.

The driver 21 is provided at the diminished end thereof with a squared opening 16, the bottom of which in operation rests against the bottom of the kerf D. The side extension 17, which is seen in Fig. 1, flanks the opening 16, extending into the groove B below the bottom of the said kerf, thereby imparting a firm hold of the driver 21 on the screw during the operation of setting the screw.

The tool as described is employed in conjunction with a screw actuated chuck E, as seen in Figs. 5 and 6 of the drawings. The chuck E may be provided as a part of a brace or of an automatic screw driver. During the first part of the operation the screw A is placed in position between the blades 11, the ends 12 extending beyond the bottom of the kerf D of the screw and into the groove B at either side thereof. The chuck E is then manipulated to contract the blades 11, 11 to force the surface 18 of the ends 12 with a gripping hold upon the shank of the screw. The driver is now in condition for operation. It will be noticed that a screw being thus rigidly held, the usual danger of the screw becoming twisted or turned during the initial operation is overcome.

The operation is continued with the screw held by the blades 11, 11 until, as shown in Fig. 5, the ends 12 have sunk within the wood F below the surface thereof. The sharpened edges 13, 13 operate to ream out a seat for the head C. In this position the chuck is manipulated to release the driver from the position shown in Fig. 5, when the same is withdrawn from the chuck and reversed to the position shown in Fig. 6. In the latter position the reduced end of the driver 21 is introduced into the kerf D, the bottom of the opening 16 resting, as above described, in the said kerf, and the extensions 17, 17 flanking the same extending within the upper end of the grooves B. When the driver is now manipulated the screw is driven until the head C rests in the seat G previously formed by the edges 13, 13 of the blades 11.

Having thus described my invention, what I claim as new and desire to secure by Letters Patent is:—

1. A screw driver, comprising a body portion having a contracted blade end; and a plurality of movable blades extended from the opposite end of said body portion to form gripping jaws shaped for seating in the kerf of a screw and extending below the bottom thereof, said extending ends being sharpened to form a seat for a screw head.

2. A screw driver, comprising a double ended tool arranged to be reversibly installed in a chuck to present successively the opposite ends, one of said ends shaped to operatively fit the kerf of a screw and the other of said ends being shaped to seat within and to extend below the kerf of a screw to infold the sides of the shank of said screw, said tool being parted lengthwise adjacent the second mentioned end to permit the contraction of said second end upon the shank of the screw.

3. In a tool of the character described, the combination of a rigid body portion having formed at one end thereof a screw driving edge; with a resilient gripping member separated lengthwise to form contractible blades, said blades being shaped to form a square recess for seating within and to extend below the bottom of a screw kerf; and means for permanently uniting the said body portion and said gripping member.

4. In a tool of the character described, the combination of a rigid body portion having formed at one end thereof a screw driving edge; with a resilient gripping member separated lengthwise to form contractible blades, said blades being shaped to form a square recess for seating within and to extend below the bottom of a screw kerf, the lower ends of said blades being sharpened to form cutting members to extend below the head of a screw; and means for permanently uniting said body portion and said gripping member.

5. In a tool of the character described, the combination of a rigid body portion having formed at one end thereof a screw driving edge; with a resilient gripping member separated lengthwise to form contractible blades, said blades being shaped to form a square recess for seating within and to extend below the bottom of a screw kerf, the lower ends of said blades being shaped and sharpened to form cutting members extending below the head of a screw to form a shaped seat therefor; and means for permanently uniting said body portion and said gripping member.

In testimony whereof I have signed my name to this specification in the presence of two subscribing witnesses.

ISAIAH L. MESSENGER.

Witnesses:
FLORENCE L. MITCHELL,
LEE C. SAUNDERS.